(12) United States Patent
Oschmann

(10) Patent No.: US 6,432,573 B1
(45) Date of Patent: Aug. 13, 2002

(54) BATTERY PLUG WITH COLLECTING ELEMENT FOR CONDENSED GASES

(76) Inventor: Elke Oschmann, Mitterweg 9-11, Bergkirchen D-85230 (DE)

(*) Notice: Subject to any disclaimer, the term of this patent is extended or adjusted under 35 U.S.C. 154(b) by 0 days.

(21) Appl. No.: 09/446,761
(22) PCT Filed: Apr. 24, 1998
(86) PCT No.: PCT/EP98/02444
§ 371 (c)(1), (2), (4) Date: Mar. 2, 2000
(87) PCT Pub. No.: WO99/56330
PCT Pub. Date: Nov. 4, 1999

(51) Int. Cl.⁷ .................................. H01M 2/12
(52) U.S. Cl. ...................................... 429/89
(58) Field of Search .................. 429/53, 54, 57, 429/79, 81, 82, 89, 175, 177, 185, 121; 137/260

(56) References Cited

U.S. PATENT DOCUMENTS

| | | |
|---|---|---|
| 2,610,986 A | 9/1952 | Brister |
| 2,937,223 A | 5/1960 | Thompson |
| 3,944,437 A * | 3/1976 | Auerbach |
| 4,400,450 A * | 8/1983 | Wagner |
| 4,689,281 A * | 8/1987 | Dandona et al. |

FOREIGN PATENT DOCUMENTS

| | | | |
|---|---|---|---|
| DE | 1496263 | * | 4/1969 |
| DE | 7825161 U | * | 11/1978 |
| FR | 1252543 | * | 12/1960 |
| FR | 2532475 | * | 3/1984 |
| JP | 62-193058 A | * | 8/1987 |
| JP | 09-045305 A | * | 2/1997 |

* cited by examiner

Primary Examiner—Carol Chaney
Assistant Examiner—Susy Tsang-Foster
(74) Attorney, Agent, or Firm—Cohen, Pontani, Lieberman & Pavane

(57) ABSTRACT

The invention relates to a battery plug for closing battery cells. The plug is formed of an essentially cylindrical housing which is open at the bottom and which can be inserted into the opening of the cell. The housing has an upper opening which can be closed by a lid. The plug has a collector mechanism located in the area of this upper opening for receiving gases which have risen and condensed. The collector mechanism may consist of a labyrinth insert whose top is provided with holes and pins extending downwards from the top.

14 Claims, 5 Drawing Sheets

BATTERY PLUG WITH COLLECTING ELEMENT FOR CONDENSED GASES

BACKGROUND OF THE INVENTION

The invention relates to a plug for closing battery cells, having an essentially cylindrical housing which can be inserted into an opening of the cell, is open at the bottom and whose upper opening can be closed by a lid.

In batteries for motor vehicles the accumulator cells are closed by a plug which is screwed into the opening of the cell by means of a thread. A screw plug of this type is entirely adequate, since in these batteries the level of the liquid electrolyte need only be checked occasionally. In contrast, more powerful batteries (heavy-duty accumulators) must be checked and topped up at substantially shorter intervals. Accordingly for the more powerful batteries plugs of the design outlined above are used whose upper opening—the checking and top-up opening—can be closed by a lid. This facilitates checking of the level, which is required at short intervals. However, it is disadvantageous that high-capacity batteries must be topped up very frequently, depending on their operational purpose, in many cases even daily, in order to compensate for the loss of liquid in the cell.

SUMMARY OF THE INVENTION

The invention is based on the object of providing a battery plug of the specified generic type, which is designed in such a manner that the evaporating liquid rising out of the cell is caught by simple means and returned back into the cell, with the result that checking and topping up can be carried out at substantially longer intervals.

According to the invention, this object is achieved in the case of a plug of the specified design by a collecting element for receiving rising and condensed gases being arranged in the region of the upper opening of the housing.

Since this collecting element is provided in the upper region of the plug, where temperatures are lower than in the underlying zones, the condensing of the rising gas is assisted, so that the liquid can be collected here and passed back into the cell.

IN A PREFERRED EMBODIMENT

The collecting element has a multiplicity of pins which protrude downward from a cover of the collecting element. The plurality of pins provides a very large surface area for the condensation. The pins allow the condensed liquid to drip downward and returned into the cell.

It is particularly advantageous if the collecting element consists of a labyrinth insert which has a cover which is interspersed with holes and from which the pins downwardly flood. The labyrinth insert can be fastened to the inside of the lid with a snap fit or in another manner, or else can be of integral design with the lid.

It has proven particularly advantageous in practice if, with the lid closed, the labyrinth insert forms, with its lower edge, a seal with respect to the inner wall of the housing, and between its cover and the insert of the lid bounds a flat clearance space which is connected via lateral passage openings to an annular space between the labyrinth insert and the inner wall of the housing, which inner wall has a degassing opening.

In this embodiment, the rising gases which are produced during operation in the plug housing initially sweep past the pins, where the condensing liquid precipitates. The gases then pass through the holes in the cover into the flat clearance space, where condensing gas is once again retained. The gases, which are virtually completely dehumidified, then pass via the lateral passage openings into the annular space and can escape from there to the outside by way of the degassing opening.

Battery plugs of the described design, which are provided for manual topping up of liquid, generally have a holder which is tapered conically downward, is inserted from above into the opening of the housing and protrudes downward as a small holder of smaller diameter. In the fitted state of the plug the lower end of the smaller holder is not intended to stand on the accumulator plates, it is merely intended to facilitate the checking and topping up. The smaller holder, which protrudes downward from the bottom of the conically tapered holder, serves mainly as an indicating element for the necessary filling height. During a check it can easily be established whether the filling level lies at the height of the open bottom of the holder, from which the small holder of lower diameter protrudes downward. However, since the distance between the upper periphery of the accumulator plates and the opening of the cell differs in different types of battery, a multiplicity of holders have to be kept ready in order to accommadate these dimensional differences.

In order to solve this problem in the case of a battery plug according to the invention, provision is made for the holder to be held by its upper edge in the housing in a longitudinally adjustable manner. In this case, it is preferred to fix the holder by its upper edge in the housing in an infinitely adjustable manner by means of frictional engagement against the inner wall of the housing. Radially resilient barbs and latching studs, which ensure the frictional engagement between the holder and housing, can protrude from the upper edge of the holder.

It is therefore possible to keep a standard holder ready for all sizes of battery, the holder being pulled out as far as possible before the plug is inserted into the cell opening. During the subsequent insertion into the cell opening the small holder is supported with its lower end on the upper side of the plates of the cell and is displaced relative to the housing until the latter has been completely inserted into the opening of the cell lid.

Height compensation, which may be necessary due to thermal expansion of the accumulator plates during operation, is provided as a consequence of the frictional engagement between the housing wall and barbs.

In another embodiment of the invention, the inner wall of the housing has latching sockets lying axially one above another on one side, for the snap-action engagement of the latching studs. This makes it possible to establish predetermined, specified positions for the position of the holder, which positions are suitable for most commercially available designs.

In the invention it is possible to insert the holder, rotated through 180°, into the housing, so that in a first position the latching studs engage in the latching sockets, while in the second position rotated through 180°, the latching studs do not engage in the latching sockets and bear in a frictionally engaged manner against the inner wall of the housing in order for the holder to be infinitely adjusted.

The various features of novelty which characterize the invention are pointed out with particularity in the claims appended to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
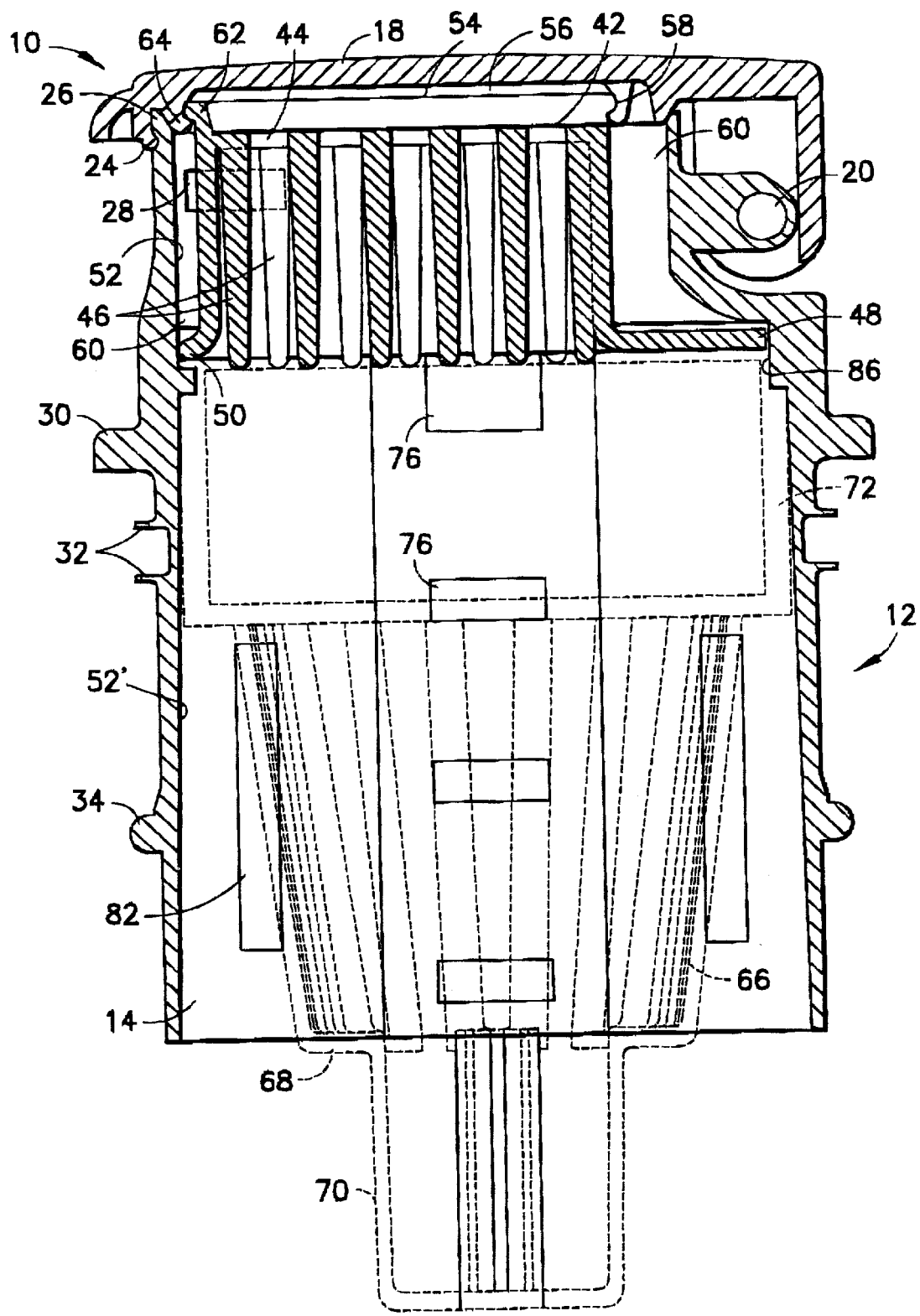
FIG. 1 shows a longitudinal section through a plug according to the invention.
Figure 2:
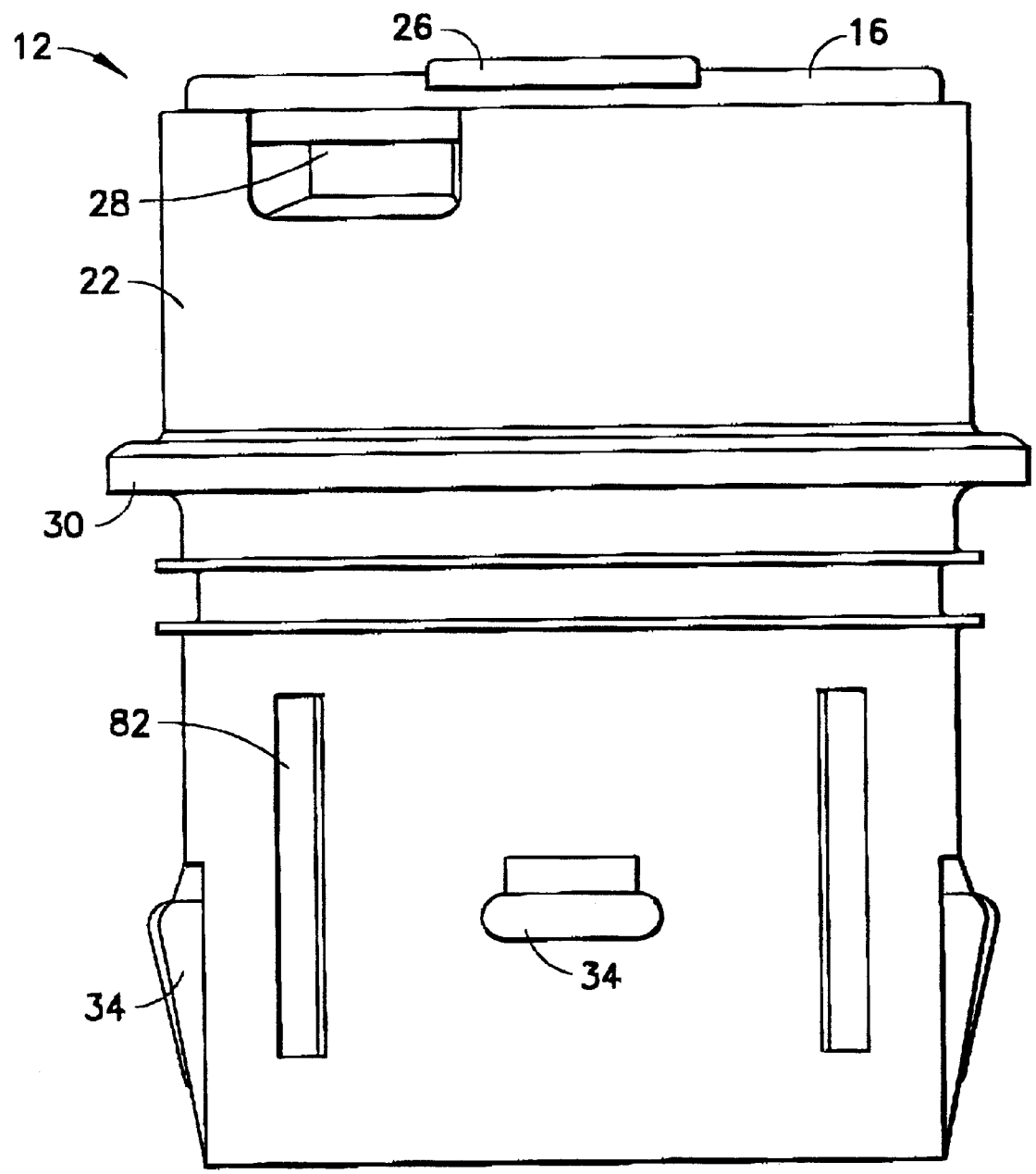
FIG. 2 shows a side view of the housing of the plug.
Figure 3:
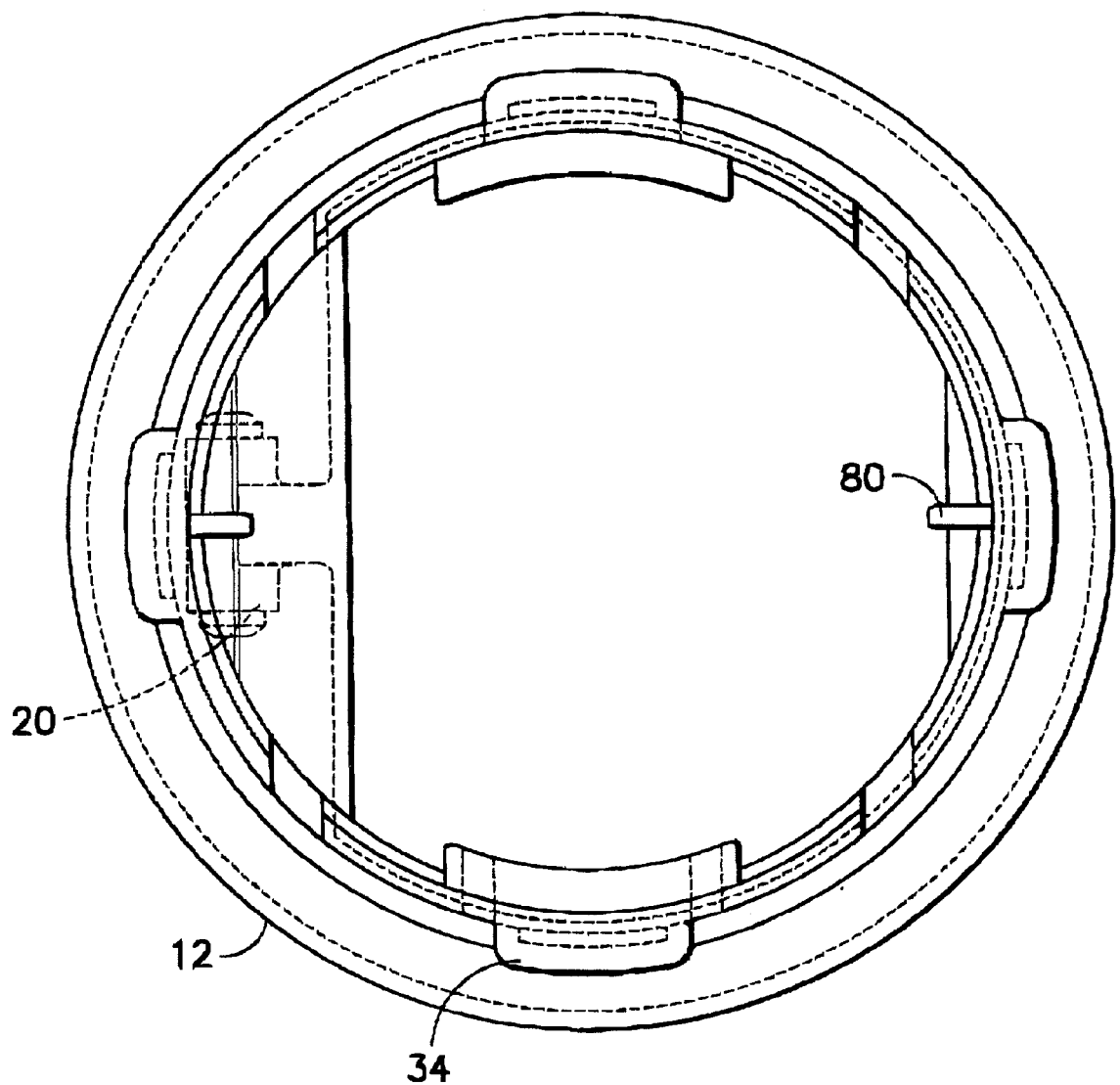
FIG. 3 shows a view from below of the housing of FIG. 2.

FIGS. 1 to 3 show a plug 10 with an essentially cylindrical housing 12 which is produced from plastic having an open lower side 14, while an upper opening 16 is closed by a lid 18, which is likewise injection molded from plastic. The lid 18 is coupled pivotably to the upper edge 22 of the housing 12 by a hinge 20. In the closed position shown in FIG. 1, an elastically flexible edge region 24 of the lid 18 engages with a snap fit over a notch 26 on the upper edge 22 of the housing 12.

FIGS. 1 and 2 also show a degassing opening 28 incorporated into the upper edge 22 of the housing 12, through which gases can escape from the battery cell, on whose opening the plug 10 is placed, to the outside.

In the central region of the housing 12 there is formed a circumferential flange 30 which rests on the cell opening in the fitted state of the plug 10. Below the flange 30 two narrow sealing lips 32 are integrally formed on the outside of the cylindrical housing 12, and in the lower region the housing 12 has four outwardly protruding beads 34 which grip the cell opening from behind at the lower edge in the installed state of the plug 10. Longitudinal apertures 82 formed between the beads 34 ensure that the lower region of the housing 12 is elastically flexible in the radial direction.

Figure 4:
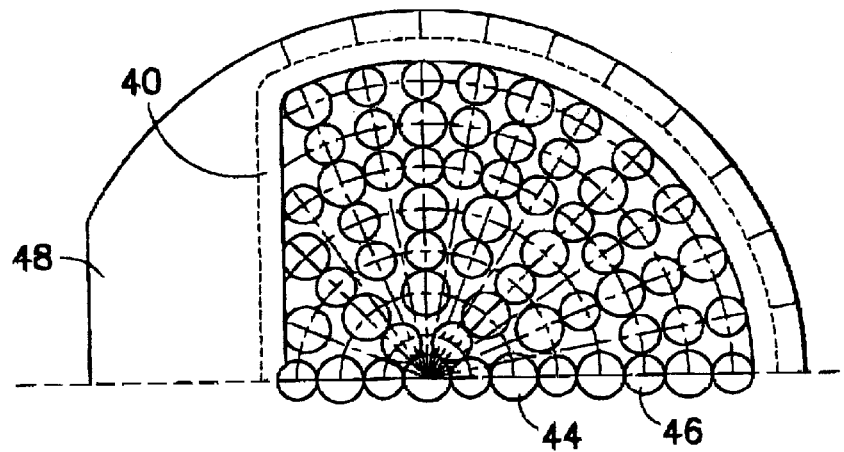
FIG. 4 shows the view from below of half of the labyrinth insert.
Figure 5:
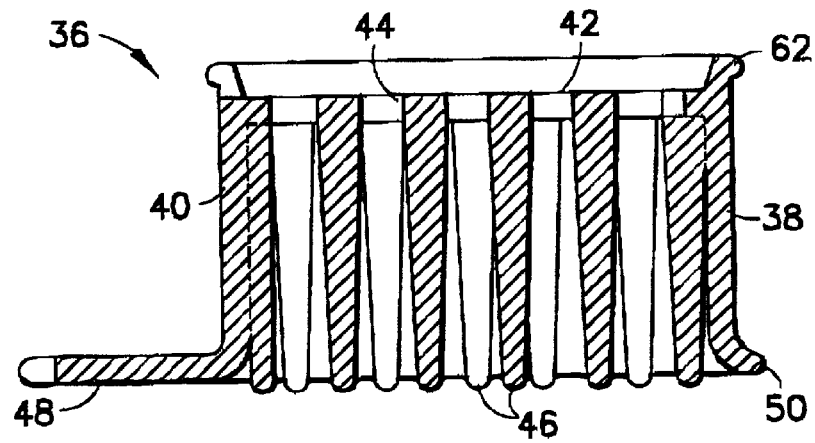
FIG. 5 shows a section through the labyrinth insert.
Figure 6:
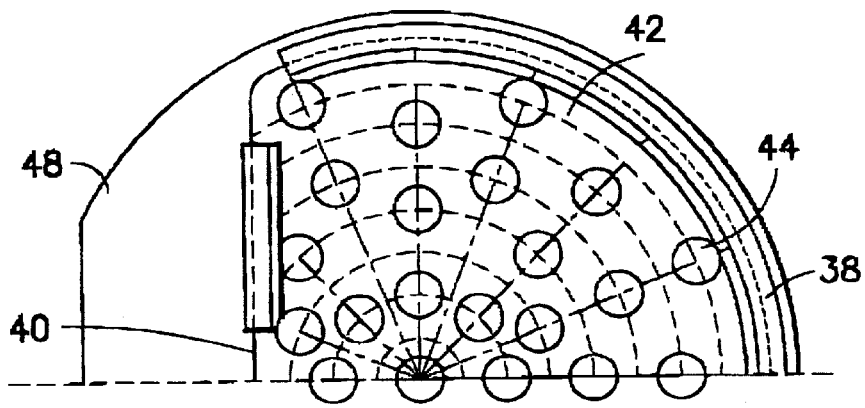
FIG. 6 shows a plan view of the labyrinth insert of FIGS. 4 and 5.

According to the invention, a labyrinth insert 36, which is illustrated in detail in FIGS. 4 to 6, is provided in the region of the upper opening 16 of the housing 12. This labyrinth insert 36, which is likewise produced from plastic, has a partially cylindrical form with a partially cylindrical outer wall 38 and a planar outer wall region 40, which both protrude downward from a cover 42 in which a multiplicity of holes 44 has been incorporated. A multiplicity of pins 46, which according to FIG. 5 have a conically tapering form, protrudes downward from the cover 42.

A tongue 48, which is parallel to the cover 42 and lies below the hinge 20 in the fitted state of FIG. 1, protrudes from the lower edge of the planar outer wall region 40 of the labyrinth insert 36.

The labyrinth insert 36 is fastened with its upper, radially protruding edge 62 with a snap fit in a receiving edge 64 of the lid 18.

FIG. 1 furthermore shows that with the lid 18 closed, the labyrinth insert 36 forms, with the lower end 50 of the partially cylindrical outer edge 38 and with its tongue 48, a seal with respect to the inner wall 52 of the housing 12. Between the cover 42 and the inside 54 of the lid 18 there is bounded a flat clearance space 56 which is connected via three lateral passage openings 58 to an annular space 60 between the labyrinth insert 36 and the inner wall 52 of the housing.

In the fitted state of the plug 10, the rising gases also entrain evaporating liquid which, as it passes between the pins 46 of the labyrinth insert 36, precipitates on the pins 46 and condenses because of the temperatures prevailing there which are lower than in the lower region. The condensed liquid then runs downward on the pins 46 and drips back into the cell, into which the plug 10 has been inserted. Before the rising gases pass via the flat clearance space 56 and the passage opening 58 into the annular space 60 in order to pass from there via the degassing opening 28 into the open, liquid which remains entrained can precipitate in the flat clearance space 56 and condense there. The condensate can run off downwardly from this clearance space 56 through the holes 44 in the cover 42 of the labyrinth insert 36.

If the twice condensed gas passes into the annular space 60, a small amount of condensate will once more be deposited there and can flow back into the cell through a narrow gap 86 between the tongue 48 and housing wall 52.

If during a check the lid 18 is pivoted about the hinge 20 into its opening position, the condensate still adhering to the pins 46 flows back into the cell via the open lower side 14 of the housing 12 due to gravitational force.

Trials using the plugs according to the invention have revealed that a considerably greater return of liquid into the battery cell is achieved compared to previously known plugs without a labyrinth insert 36. Instead of having to top up the battery cells in the case of previous plugs daily, for example, topping up only every second or third day is now sufficient.

Figure 7:
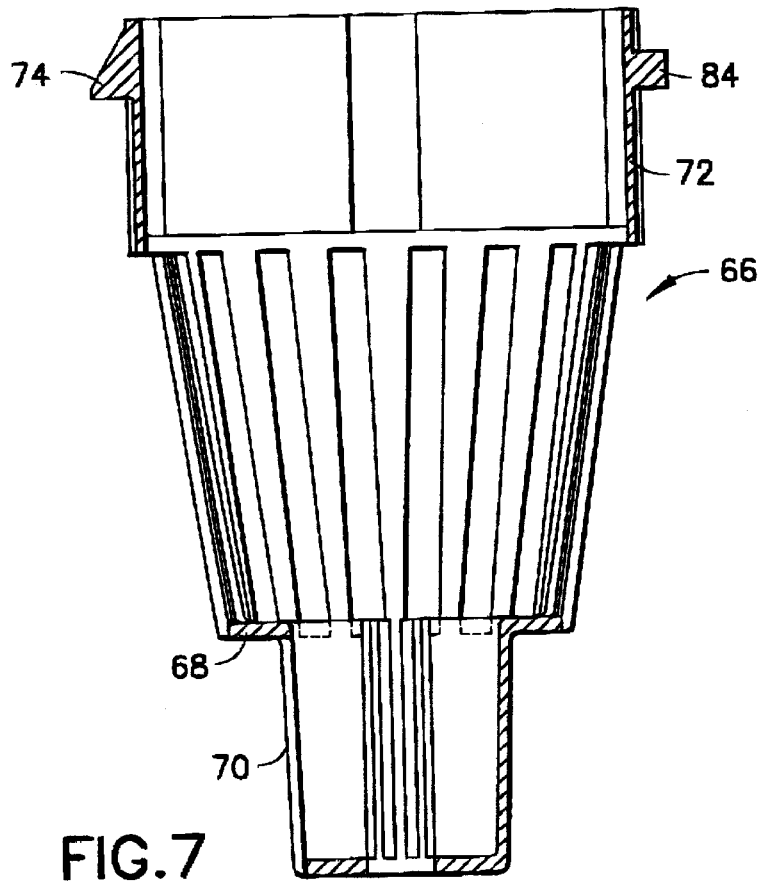
FIG. 7 shows a longitudinal section through the holder.
Figure 8:
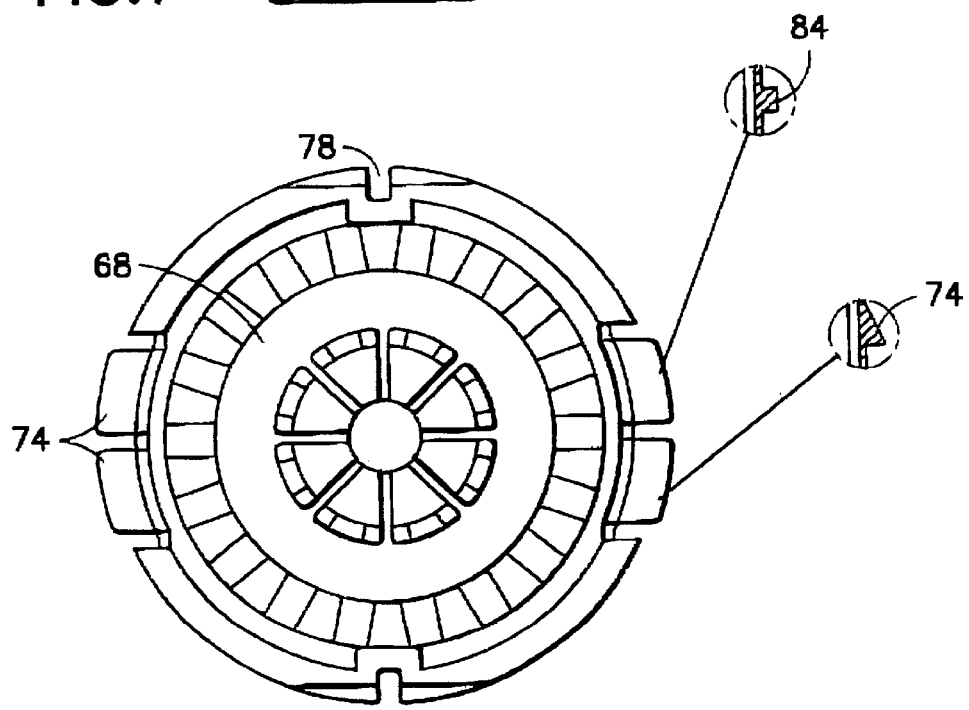
FIG. 8 shows a plan view of the holder of FIG. 7.

In an embodiment of the invention according to FIGS. 1, 7, and 8, a first holder 66 which is tapered conically downward is inserted into the lower opening of the housing 12 and a second small holder 70 of smaller diameter protrudes from the open bottom 68 of the first holder. The holder 66 and small holder 70 are likewise produced in one piece from plastic by injection molding. On its upper, cylindrical edge 72, on the left side in FIGS. 7 and 8, the holder 66 is provided with barbs 74 which bear in a frictionally engaged manner against the cylindrical inner wall 52' of the housing 12 because of the radial flexibility.

Four latching sockets 76 are incorporated into the inner wall 52' of the housing 12 lying axially one above another on one side, and the latching stud 84, shown on the right in FIG. 7 and which has a rectangular profile, can snap into said latching socket. This enables the holder 66 to be fixed at four different heights within the housing 12. The barb 74, which is formed in addition to the latching stud 84, serves as an end stop and prevents the holder 66 from falling out in its lowermost position.

If the holder 66 is pulled completely out of the housing 12, it can be reinserted into the latter rotated through 180°, so that the barbs 74, which are on the left in FIG. 7 and which are shaped differently to the latching stud 84, now lie in the region of the latching socket 76, but do not engage therein in a latching manner. In this second position, the holder 66 can therefore be adjusted in a frictionally engaged and infinitely variable manner on the inner wall 52' of the housing 12.

Two longitudinal slots 78 are incorporated lying diametrically opposite each other into the upper, cylindrical edge 72 of the holder 66, and guide ribs 80 which protrude from the inner wall 52' of the housing 12 engage in said longitudinal slots. Said guide ribs, together with the two longitudinal slots 78, define the two positions, rotated through 180°, of the holder 66 in the housing 12.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

I claim:

1. A plug for closing a battery cell, comprising: an essentially cylindrical housing which can be inserted into an opening of the cell, said housing having an upper opening and an open bottom; a lid adapted for closing said upper opening; and a collecting element for receiving rising and condensed gases, said collecting element being positioned in the region of the upper opening of the housing and comprising a labyrinth insert which has a cover which is interspersed with holes and from which pins downwardly protrude.

2. The plug of claim 1, wherein the lid has an inside and the labyrinth insert is attached to the inside of the lid.

3. The plug of claim 2, wherein the labyrinth insert is fastened in the lid with a snap fit.

4. The plug of claim 1, wherein the housing has an inner wall and the labyrinth insert has a lower edge which forms a seal with respect to the inner wall of the housing when said lid is closed.

5. The plug of claim 4, wherein the lid has an inside which bounds a clearance space between said inside and the cover of the insert and which is connected via lateral passage openings to an annular space between the labyrinth insert and the inner wall of the housing.

6. The plug of claim 5, wherein a tongue protrudes from the labyrinth insert, and bounds the annular space downward and lies below a hinge, by which the lid is coupled pivotably to the housing.

7. The plug of claim 1, wherein a first holder, which is tapered conically downward and having an upper edge, has an open bottom and is inserted into the lower opening of the housing and a second holder of smaller diameter protrudes from the open bottom of said first holder.

8. The plug of claim 7, wherein the first holder has an upper edge and is held in the housing in a longitudinally adjustable manner.

9. The plug of claim 8, wherein radially resilient barbs and latching studs protrude from the upper edge of the first holder.

10. The plug of claim 9, wherein the housing has an inner wall with latching sockets lying one above another axially for the snap-action engagement of a latching stud.

11. The plug of claim 10, wherein the first holder is adapted to be inserted, in a manner such that it can be rotated through 180°, into the housing so that in a first position the latching studs engage the latching sockets, while in the second position pivoted through 180°, said latching studs do not engage in said latching sockets and bear in a frictionally engaged manner against the inner wall of the housing in order for the holder to be adjusted.

12. The plug of claim 7, wherein the housing has an inner wall and two longitudinal slots are incorporated diametrically opposite each other into the upper edge of the first holder, and two guide ribs protruding from the inner wall of the housing engage in said longitudinal slots.

13. The plug of claim 5, wherein the housing has a degassing opening at an upper edge thereof.

14. The plug of claim 7, wherein the housing has an inner wall and first holder is fixed by its upper edge in the housing in an adjustable manner by means of frictional engagement against the inner wall of the housing.

* * * * *